UNITED STATES PATENT OFFICE.

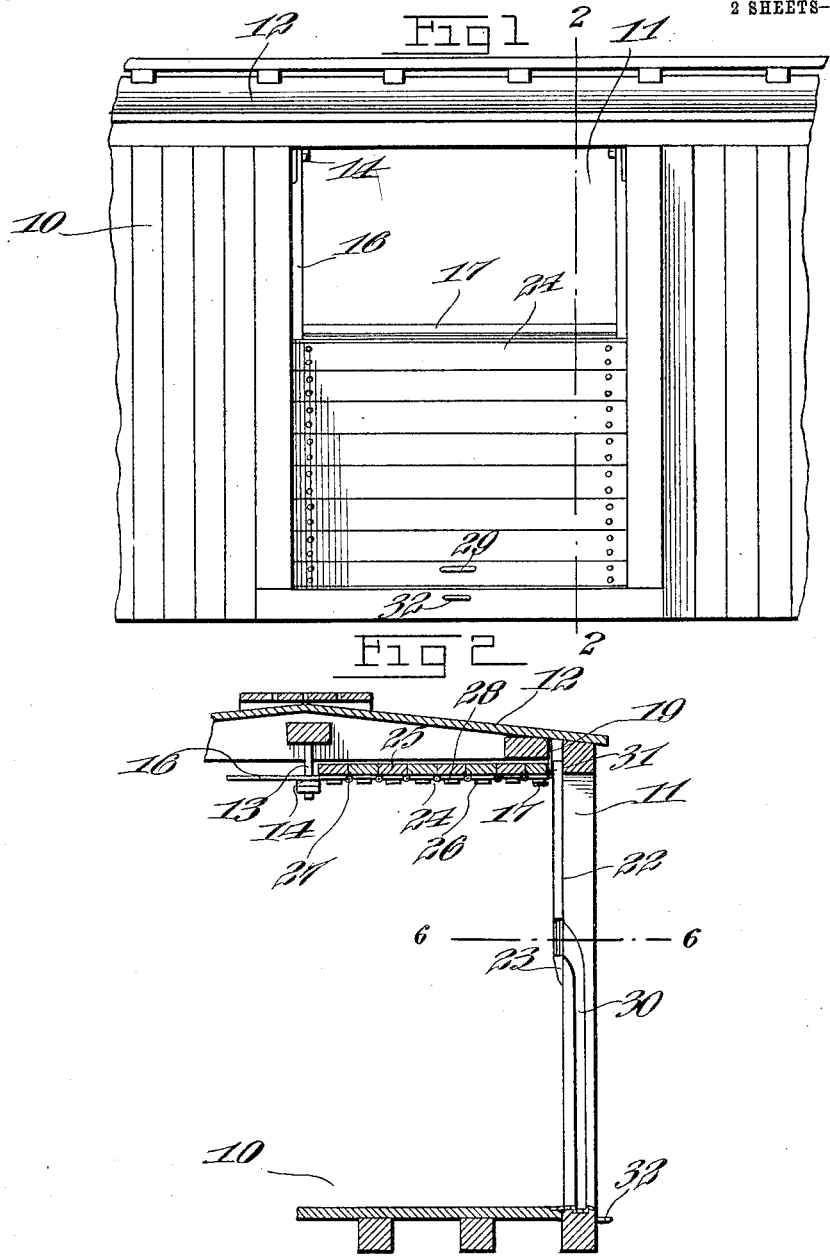

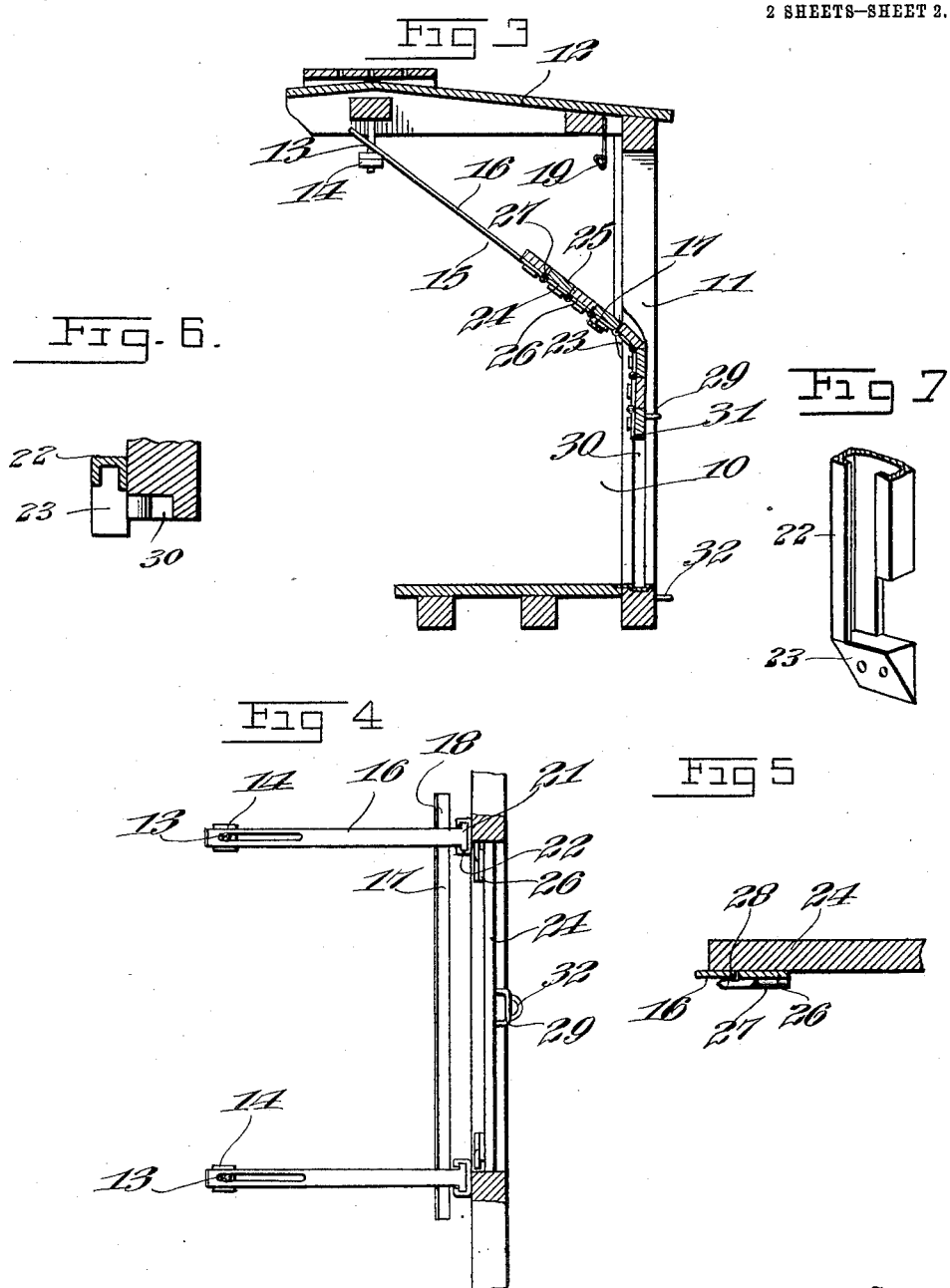

GEORGE H. SMITH, OF RELIANCE, SOUTH DAKOTA.

CAR-DOOR.

1,082,450.  Specification of Letters Patent.  Patented Dec. 23, 1913.

Application filed March 26, 1912. Serial No. 686,264.

*To all whom it may concern:*

Be it known that I, GEORGE H. SMITH, a citizen of the United States, residing at Reliance, in the county of Lyman and State of South Dakota, have invented new and useful Improvements in Car-Doors, of which the following is a specification.

An object of the invention is to provide a door for cars, particularly adapted for use on freight cars of that type which are adapted for the conveyance of grain and the like.

The invention embodies among other features a car door which is arranged to slide within the car so that the same can be swung into inoperative and open position beneath the roof of the car without interfering with the operation of unloading the contents of the car.

A large number of car doors now employed in connection with freight cars and the like are arranged to slide along one of the walls of the car and in arranging a door in this manner the wall of the car is greatly weakened and the door and its mountings being exposed to the elements does not operate smoothly and in a short time is unfit for further use. The usual method, however, of closing cars carrying grain and the like, is to provide planks so arranged as to extend across the opening to close the same. When the grain is unloaded from the car these planks are removed and discarded and consequently each time that the car is filled with grain, it is necessary to provide new planks, thus incurring considerable expense for providing suitable lumber to accomplish the desired result.

With the use of my device the above mentioned discrepancies are avoided and the door is mounted to move within the car when the door is opened so that the door and its mountings will not be exposed to the elements and the door being so mounted will not weaken the walls of the car, while at the same time the door can be easily moved into open or closed position, the closing movement of the door being gravitational.

In the further disclosure of the invention, reference is to be had to the accompanying drawings constituting a part of this specification, in which similar characters of reference denote corresponding parts in all the views, and in which:—

Figure 1 is a fragmentary side elevation of a car showing my device applied thereto, the door being in closed position. Fig. 2 is a vertical transverse sectional view taken on the line 2—2 in Fig. 1, showing the door in open and locked position. Fig. 3 is a similar vertical transverse sectional view showing the door in partially open position. Fig. 4 is a fragmentary plan view of the car, the roof being removed therefrom to show the door in closed position. Fig. 5 is a fragmentary vertical transverse sectional view of the guides on the under side of the door body, showing the retaining members thereof for retaining the door body on the track. Fig. 6 is a section taken on line 6—6 of Fig. 2; Fig. 7 is a detail perspective view of one of the guide members.

Referring more particularly to the views, I provide a car 10 provided with the usual opening 11 and secured to the under side of the roof 12 of the car 10 are depending guide rods 13 provided at their lower ends with enlarged heads 14.

Mounted to slide and to turn on the guide rods 13 is a track, comprising slotted bars 16, the guide rods 13 being extended through the slots of the said bars and the said track being prevented from disengagement with the said bars by the enlarged heads 14 thereof, the slots in the bars 16 being made sufficiently long to permit of swinging and sliding the track. A cross piece 17 is secured to the forward ends of the bars 16 and terminates in extensions 18, extending beyond the longitudinal planes of the bars 16, the mentioned extensions 18 being adapted to engage suspending member 19, secured to the under side of the roof 12 of the car 10, the said suspending member being preferably made of a spring like material and terminating at their lower ends in hooks, which when engaged by the extensions 18 will retain the track in suspended or inoperative position.

The extreme forward ends of the bars 16, which together with the cross piece 17 form the track, are formed into heads 21 movable over guide members 22, secured to the inner side of the car 10, on both sides of the opening 11 thereof, the lower ends of the guide members being provided with stop lugs 23 for limiting the downward movement of the forward ends of the bar 16.

Mounted to slide upon the track is a door body 24, consisting of boards 25 provided with guide members 26 on the lateral or vertical edges thereof, the said guide members being arranged to form hinges 27 which hingedly connect the boards 25 to form the door body 24, the outer edges of the guide members 26 being arranged to engage the inner edges of the track to permit of sliding the door body 24 longitudinally on the bar 16 and preventing the dislocation of the door body upon the track; retaining members 28 being mounted to extend from the guide members 26 to pass beneath the bars 16 and arranged so that portions of the bars 16, forming the track will lie between the door body 24 and the retaining members 28 without preventing a sliding movement of the door body upon the track, the mentioned guide members 28 being provided to prevent the door body 24 from being lifted from the track as will be hereinafter more fully disclosed.

The door body 24 is provided with a handle 29 and formed in the edges of the walls of the car, which form the opening 11, are grooves 30 adapted to receive the body 24 when the same is gravitationally moved into closed position, the upper ends of the grooves 30 being arranged to terminate at the points where the forward ends of the slotted bars 16 repose, when the mentioned bars are in lowered position and reposing upon the stop lugs 23. The lower edge of the door body 24 is provided with a suitable reinforcing strip 31 and the handle 29 of the door body can be suitably fashioned to form a staple-like member, which will lie adjacent a stirrup 32, secured to the wall of the car 10, when the door body is in closed position, so that a suitable seal or lock can be passed through the stirrup 32 and the staple-like handle to lock the door body in closed position.

Assuming that the door body is in closed position, when it is desired to remove the grain from the car 10, the seal or lock which locks the door body to the car, when the door body is in closed position, is first broken or removed. The handle 29 of the door body 24 is now grasped and by pulling upwardly thereon the door will slide in the grooves 30 and move onto the track, the forward ends of the track being in lowermost position, it being understood that the door body in moving from the grooves onto the track will bend or flex owing to the manner of hingedly connecting the boards 25, forming the door body; it being also understood that the guide members 26 will facilitate the operation of sliding the door body onto the track. When the door body is moved entirely onto the track, a direct upward pull is exerted upon the door body, thus causing the forward ends of the track to operate in the guide members 22 and as the door body is retained upon the track by the retaining members 28, when the upward pull is exerted upon the door body, the track will swing upwardly with the door body and the track will also slide inwardly on the guide rods 13, the extensions 18 being adapted to engage the suspending members 19, which fashioned from a spring-like material and provided with the hooks 20, will lock the track in its uppermost position, thus also retaining the door body in locked and open position so that the door body and track will lie immediately beneath the roof of the car, thus in no manner preventing the proper unloading of the grain from the car.

When it is desired to move the door body into closed position, a pressure is exerted against the suspending members 19 to disengage the extensions 18 therefrom and the weight of the door body, reposing upon the track will cause the track to swing downwardly and to slide upon the guide rods 13 so that the track will assume an inclined position with the forward ends of the track reposing upon the stop lugs 23, it being understood that the forward ends of the track terminate at the point where the grooves 30 commence so that the door body 24, owing to the inclination of the track, will slide along the track and move into the grooves 30, the door body being thus adapted to move gravitationally and close the opening 11 of the car 10.

It will be understood that I do not limit myself to the use of my device in connection with cars of the character described and that the mentioned device can be also employed in connection with coal cars, bins or other vessels.

I claim:—

1. The combination with a freight car having its door posts provided with guideways opening at their upper ends into the car to provide entrances thereto, a track inclined upwardly from the entrances of said guide-ways, a door body slidably mounted in the guide-ways and adapted to be moved therefrom onto the tracks, means mounting the track so that said track and the door body may be swung into a horizontal position, and means adapted to secure the track and door body in a horizontal position.

2. The combination with a freight car having its door posts provided with guideways opening at their upper ends into the car to provide entrances thereto, a track inclined upwardly from the entrances of said guide-ways, a door body slidably mounted in the guide-ways and adapted to be moved therefrom onto the track, means for pivotally and slidably mounting the track so that the latter and the door body may be swung into a horizontal position, and means adapted to secure the track and door body in a horizontal position.

3. The combination with a freight car having its door posts provided with guideways opening at their upper ends into the car to provide entrances thereto, a track having slots inclined upwardly and forwardly from the entrances of said guide-ways, a door body slidably mounted in the guide-ways and adapted to be moved therefrom onto the track, means passing through the slots of the track for pivotally and slidably mounting the track so that the latter and the door body may be swung into a horizontal position, and means adapted to secure the track and door body in a horizontal position.

4. The combination with a freight car having its door posts provided with guide-ways opening at their upper ends into the car to provide entrances thereto, a track inclined upwardly from the entrances of said guide-ways, a door body slidably mounted in the guide-ways, and adapted to be moved therefrom onto the track, means mounted on said door body for retaining said door body in engagement with the said track, means mounting the track so that the latter and the door body may be swung into a horizontal position, and means adapted to secure the track and door body in a horizontal position.

In testimony whereof I affix my signature in presence of two witnesses.

GEORGE H. SMITH.

Witnesses:
JEAN A. NORRIS,
R. E. BROWN.

---

Copies of this patent may be obtained for five cents each, by addressing the "Commissioner of Patents, Washington, D. C."